(No Model.)
H. E. BOYD.
TUBE COUPLING.
No. 283,960. Patented Aug. 28, 1883.
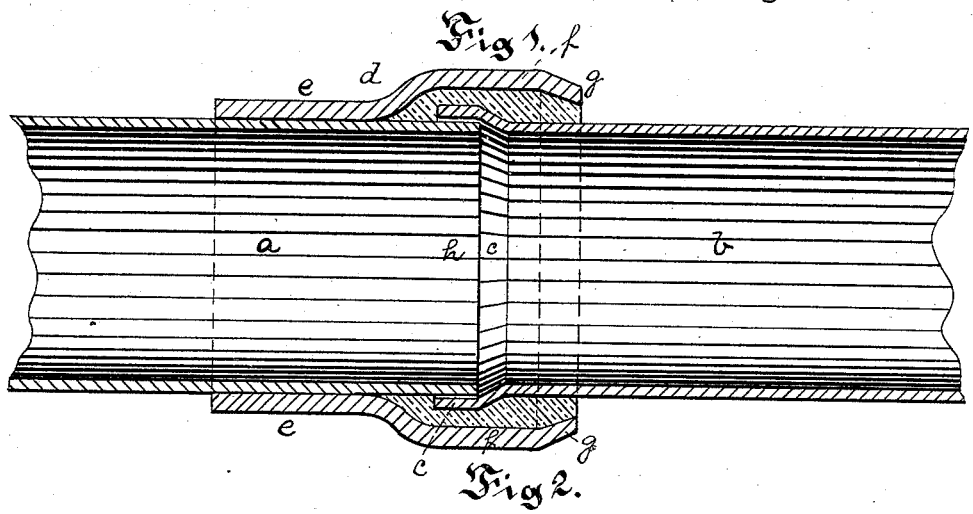
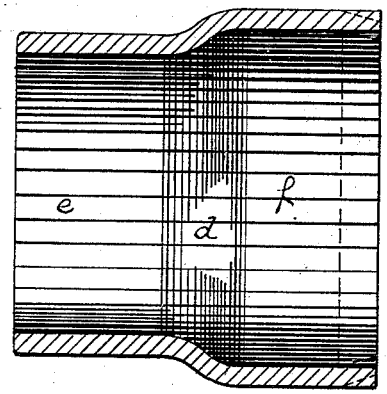
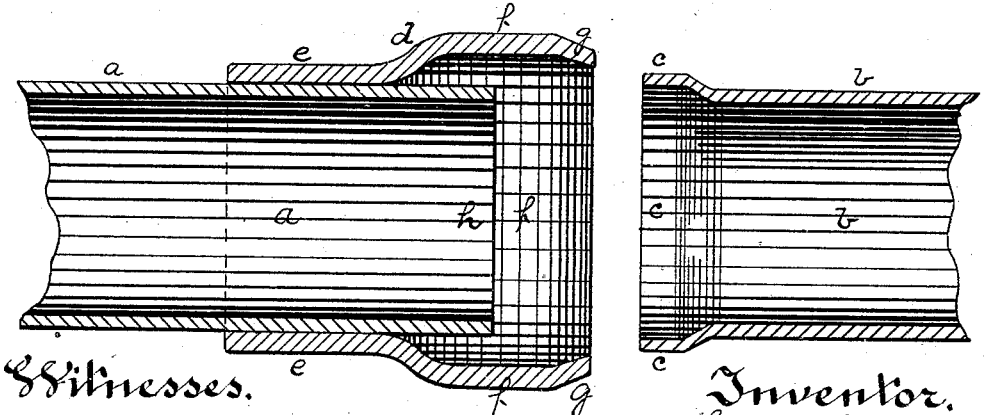
Witnesses.
Inventor.
Henry E. Boyd
by James I. Kay
Attorney

UNITED STATES PATENT OFFICE.

HENRY E. BOYD, OF McKEESPORT, PENNSYLVANIA.

TUBE-COUPLING.

SPECIFICATION forming part of Letters Patent No. 283,960, dated August 28, 1883.

Application filed February 26, 1883. (No model.)

*To all whom it may concern:*

Be it known that I, HENRY E. BOYD, of McKeesport, in the county of Allegheny and State of Pennsylvania, have invented a new and useful Improvement in Joints for Tubing; and I do hereby declare the following to be a full, clear, and exact description thereof, reference being had to the accompanying drawings, forming a part of this specification.
My invention relates to means for coupling or joining wrought-metal tubing, its object being to provide an efficient coupling or joint for the light wrought-metal tubing, which is too thin to receive the ordinary screw-thread usually employed in connection with a threaded coupling-socket for uniting wrought-metal tubing. Heretofore different devices have been employed for coupling this light wrought-metal tubing, the couplings being in most cases necessarily formed of cast-iron. In some of these joints a cast-iron bell was shrunken around the end of one tube-section, and the end of this tube-section expanded to receive the end of the other tube-section inserted within the bell, the calking material fitting around the tubing within the bell.

My invention relates to a wrought-metal coupling device for connecting this light metal tubing, its object being to reduce the weight of the metal coupling, and consequently reduce the cost of shipment, and to form an efficient and secure coupling device which occupies less space than the ordinary cast-metal device, and consequently enables me to use this light metal tubing in places where, on account of the size of the coupling device, it could not heretofore be employed.

It consists, essentially, in combining with the wrought metal a wrought-metal coupling-bell welded around one end of the tubing, and having a belled portion to receive and form a calking-space around the end of another tube-section inserted therein.

It also consists in securing this wrought-metal bell around one end of the tube-section, so that the end of the tube extends out a short distance into the bell, and expanding the end of the tube-section to be coupled therein, so that it fits over the portion of the tube-section extending into the bell, and is thus centered within the bell, and is held therein by means of calking material confined between the expanded portion of the tubing and the mouth of the bell.

It also consists in contracting the mouth of the bell secured to the tubing, thus closing it in slightly and forming an enlarged space below the mouth of the bell for the reception of the calking material, so that the tubing connected within the bell is held therein by the calking material confined between the expanded portion of the tubing and the contracted mouth of the bell.

To enable others skilled in the art to make and use my invention, I will describe the same more fully, referring for that purpose to the accompanying drawings, forming part of this specification, in which—

Figure 1 is a longitudinal section of my tube-coupling. Fig. 2 is a like view of the bell before it is welded on the tubing, and Fig. 3 is a like view of the end of the tubing having the bell welded thereon.

In the drawings, $a$ represents the end of one tube-section and $b$ the end of the other tube-section, the tubing being what is termed "light-metal tubing," and being formed of wrought metal, the body of which, when not cut into screw-thread or like device, is sufficiently thick to stand heavy pressure strains, but which, when cut into in this manner, is so weakened at the joint or coupling as to render it unfit for use under heavy pressures. The end of one tube-section, $b$, is expanded slightly by suitable tools or machinery, so that it fits around the end of the tube-section $a$, the portion thus expanded forming a sleeve, $c$, and being made to fit the end of the tube-section $a$ neatly and extend a short distance over the same.

$d$ represents the wrought-metal bell, which is either formed of a piece of tubing of larger size than the tubing to be connected, or is welded from plate metal in the usual manner of forming coupling-sockets. The body $e$ of the bell is formed of proper diameter to fit around the body of the tube-section $a$, and the enlarged portion $f$ is of such diameter as to form a space around the expanded end $c$ of the tube-section $b$ when entered within the bell, this space being for the reception of lead or other suitable calking material by which the joint is sealed. The mouth $g$ of the bell is contracted, so as to form an enlarged calking-space below it, it being only necessary that the mouth be large enough to permit the entrance of the expanded end $c$ of the tube-section $b$ within it. When the coupling-bell $d$ is formed of a short piece of tubing, a piece corresponding in diameter to the enlarged or belled portion $f$ is heated and contracted by suitable tools to form the body $e$ of proper diameter to fit around and be secured to the tube-section $a$. It may also be formed of a short piece of tubing corresponding in diameter to the body $e$, and the enlarged portion $f$ expanded at the end thereof; but the former method is preferred, as the expanding of the tubing is liable to weaken it, while the contracting of the tubing strengthens it. This bell and the end of the tube-section $a$ are then brought to a welding heat, and the part $e$ of the bell is welded to the tubing a short distance back from the end thereof, so that the end $h$ of the tubing extends out a short distance into the bell, the tubing being supported on a suitable mandrel during the welding operation. While the coupling-bell is still hot, it is then put under a hammer, furnished with suitable dies, and the end is closed in slightly, so as to form the contracted mouth $g$ of the bell. If desired, however, the coupling-bell may be first formed with this contracted mouth, and afterward welded to the tubing. It may also be secured to the tubing by shrinking, the portion $e$ of the bell being made so that its inner diameter is slightly smaller than the outer diameter of the tubing, and the bell is then heated so as to expand it sufficiently to pass over the end of the tubing, and upon the cooling of the coupling-bell it will shrink tightly around the tubing and hold thereto; and, to make more secure, the end of the portion $e$ may be calked with suitable tools around the tubing. I prefer, however, to weld the bell to the tube-section, as it is more firmly secured thereto, the shrinking of the bell on the tubing, as illustrated in the cast-metal bells above referred to, not making a pressure-proof joint between them, but requiring the calking of the joint to prevent leakage.

When a coupling is to be formed, the tube-section $b$ is inserted within the belled portion $f$ of the coupling-bell $d$, its expanded end fitting around the end $h$ of the tube-section $a$, extending into the bell $f$. The melted lead or other calking material is then poured into the calking-space between the tube-sections and the belled portion $f$ of the coupling-bell $d$, and is calked or packed in the usual manner. The calking material enters around the end $h$ of the tube-section $a$, beyond the end of the expanded end $c$ of the tube-section $b$, and around the expanded end $c$ and the tube section $d$ below this expanded end, and thus forms a secure joint. The tube-section $b$ is held within the belled portion $f$ of the coupling-bell by means of the calking material confined between the expanded end $c$ and the contracted mouth $g$ of the coupling-bell, and is thus held against longitudinal or drawing strain. The end of the tube-section $a$ is not weakened in any way whatever, and the expanded end of the tube-section $b$ is protected and strengthened by the calking material within the belled portion $f$ of the coupling-bell, so that even if weakened by being thus expanded it is fully protected by the calking material.

What I claim as my invention, and desire to secure by Letters Patent, is—

1. In combination with wrought-metal tubing, a wrought-metal coupling-bell adapted to be welded around one end of the tubing, and having a belled portion to receive and form a calking-space around the end of another tube-section inserted within the belled portion, substantially as and for the purposes set forth.

2. The combination of the wrought-metal coupling-bell $d$, the tube-section $a$, secured therein, and having its end $h$ extending within the calking-bell $f$, and the tube-section $b$, having the expanded end $c$, adapted to fit around the end $h$ of the tube-section $a$, substantially as and for the purposes set forth.

3. The combination of the wrought-metal coupling-bell $d$, having the calking-bell $f$, provided with the contracted mouth $g$, the tube-section $a$, secured within the coupling-bell, having its end $h$ extending within the calking-bell $f$, and the tube-section $b$, having the expanded end $c$, adapted to fit around the end $h$ of the tube-section $a$, substantially as and for the purposes set forth.

In testimony whereof, I, the said HENRY E. BOYD, have hereunto set my hand.

HENRY E. BOYD.

Witnesses:
J. A. WERTENBACH,
H. A. McCLURE.